(12) United States Patent
Dropmann et al.

(10) Patent No.: US 6,237,730 B1
(45) Date of Patent: May 29, 2001

(54) FRICTION SAFETY BRAKE HAVING TWO INDEPENDENT BRAKING CIRCUITS

(75) Inventors: Christoph Dropmann, Kaufbeuren; Karl Schilling, Marktoberdorf, both of (DE)

(73) Assignee: Chr. Mayr GmbH & Co. KG, Mauerstetten (DE)

( * ) Notice: Subject to any disclaimer, the term of this patent is extended or adjusted under 35 U.S.C. 154(b) by 0 days.

(21) Appl. No.: 09/126,081

(22) Filed: Jul. 30, 1998

(30) Foreign Application Priority Data

Jul. 31, 1997 (DE) .............................................. 197 33 169

(51) Int. Cl.⁷ .................................................... F16D 55/28
(52) U.S. Cl. ............................................ 188/171; 188/163
(58) Field of Search .................................. 188/161, 162, 188/163, 171, 173, 367

(56) References Cited

U.S. PATENT DOCUMENTS

| | | | | |
|---|---|---|---|---|
| 4,337,855 | * | 7/1982 | Bennett | 192/84 A |
| 4,982,825 | * | 1/1991 | Sekella | 192/90 |
| 5,057,728 | * | 10/1991 | Dammeyer et al. | 310/77 |
| 5,154,261 | * | 10/1992 | Tanaka et al. | 188/171 |
| 5,274,290 | * | 12/1993 | Fischer | 310/93 |

FOREIGN PATENT DOCUMENTS

| | | |
|---|---|---|
| 24 04 473 | 8/1975 | (DE) . |
| 27 30 168 | 1/1979 | (DE) . |
| 83 31 477 | 1/1985 | (DE) . |
| 34 24 595 | 1/1986 | (DE) . |
| 295 10 828 U | 10/1995 | (DE) . |
| 296 11 732 U | 10/1996 | (DE) . |

\* cited by examiner

Primary Examiner—Robert J. Oberleitner
Assistant Examiner—Bradley King
(74) Attorney, Agent, or Firm—Wenderoth, Lind & Ponack, L.L.P.

(57) ABSTRACT

A friction safety brake which is released by virtue of an electromagnet is disclosed. Extending from a machine wall is a shaft that is rotatable relative to the machine wall. The shaft is to be braked by the friction safety brake. The brake includes: a first assembly comprising a coil carrier, a coupling element, a flange plate, at least one first brake disk and an intermediate disk; and a second assembly comprising an armature disk, at least a second brake disk and the intermediate disk. The flange plate is coupled in an axial direction with the coil carrier by virtue of coupling elements and is independently movable relative to the armature disk in the axial direction such that two braking circuits are available. The first braking circuit includes the armature disk, the coil carrier and the flange plate (21) coupled to each other in the direction of rotation. And, the second braking circuit includes the intermediate disk being relatively axially displaceable with respect to the coil carrier and the machine wall.

7 Claims, 7 Drawing Sheets

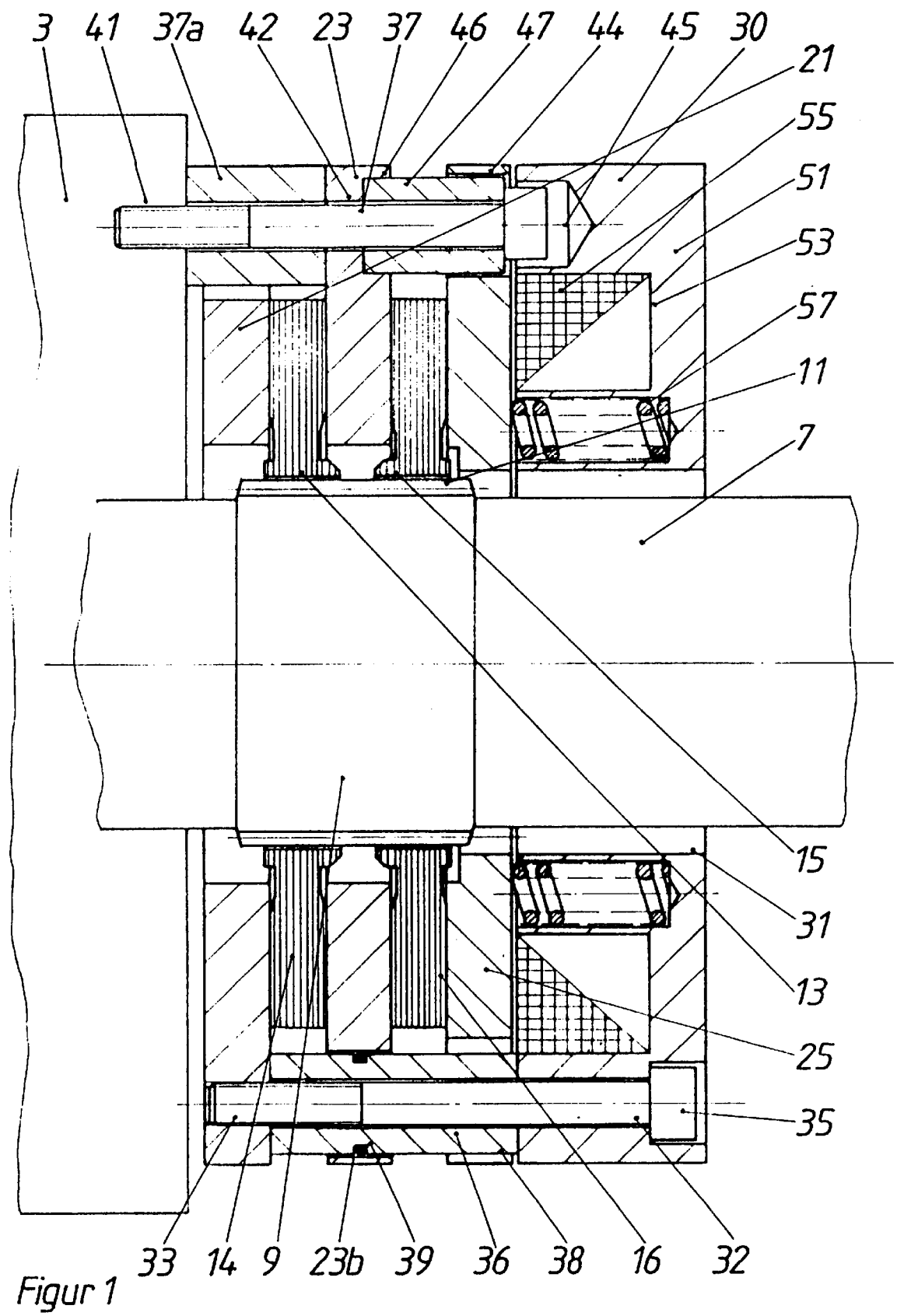
Figur 1

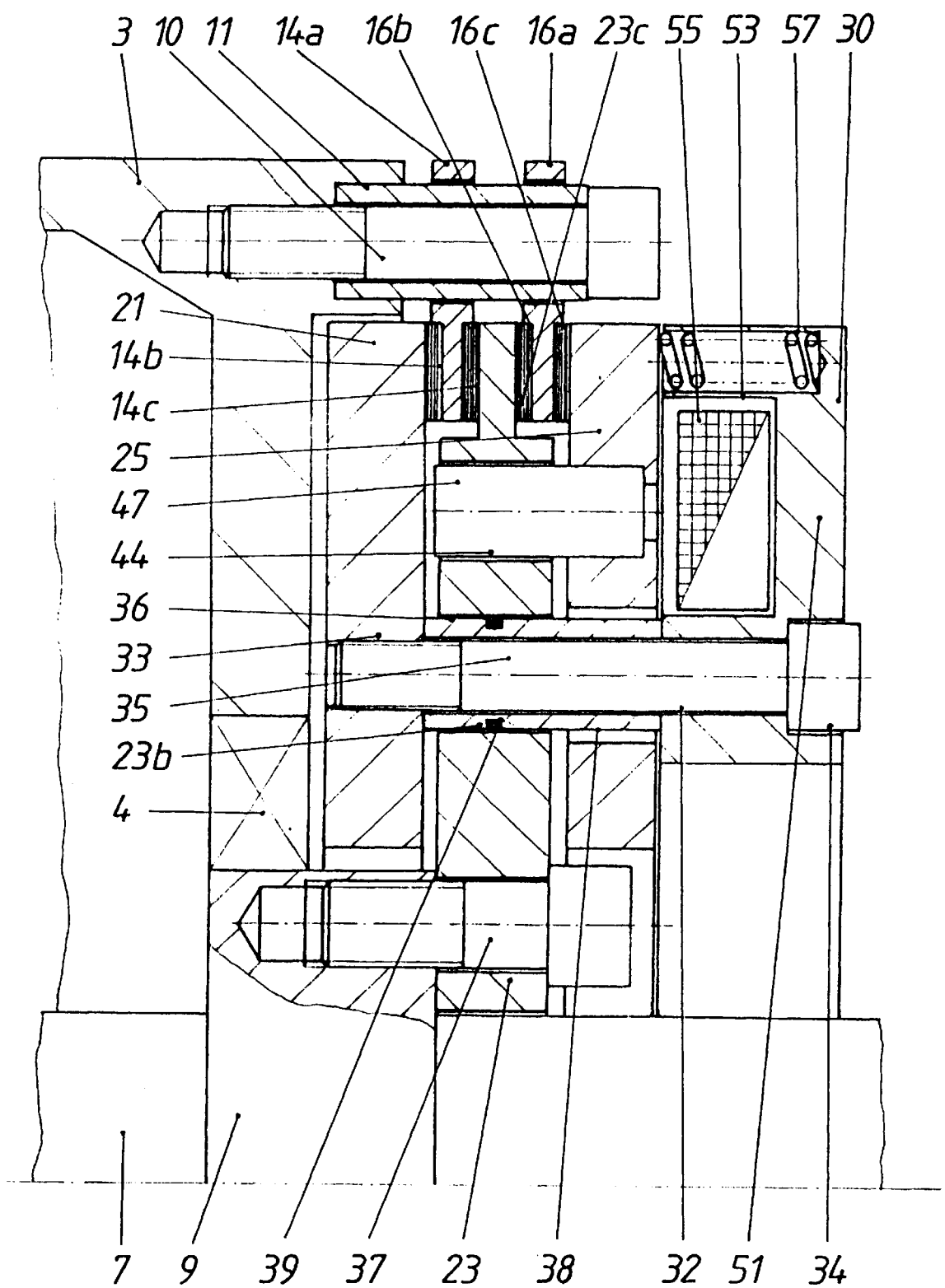
Figur 2

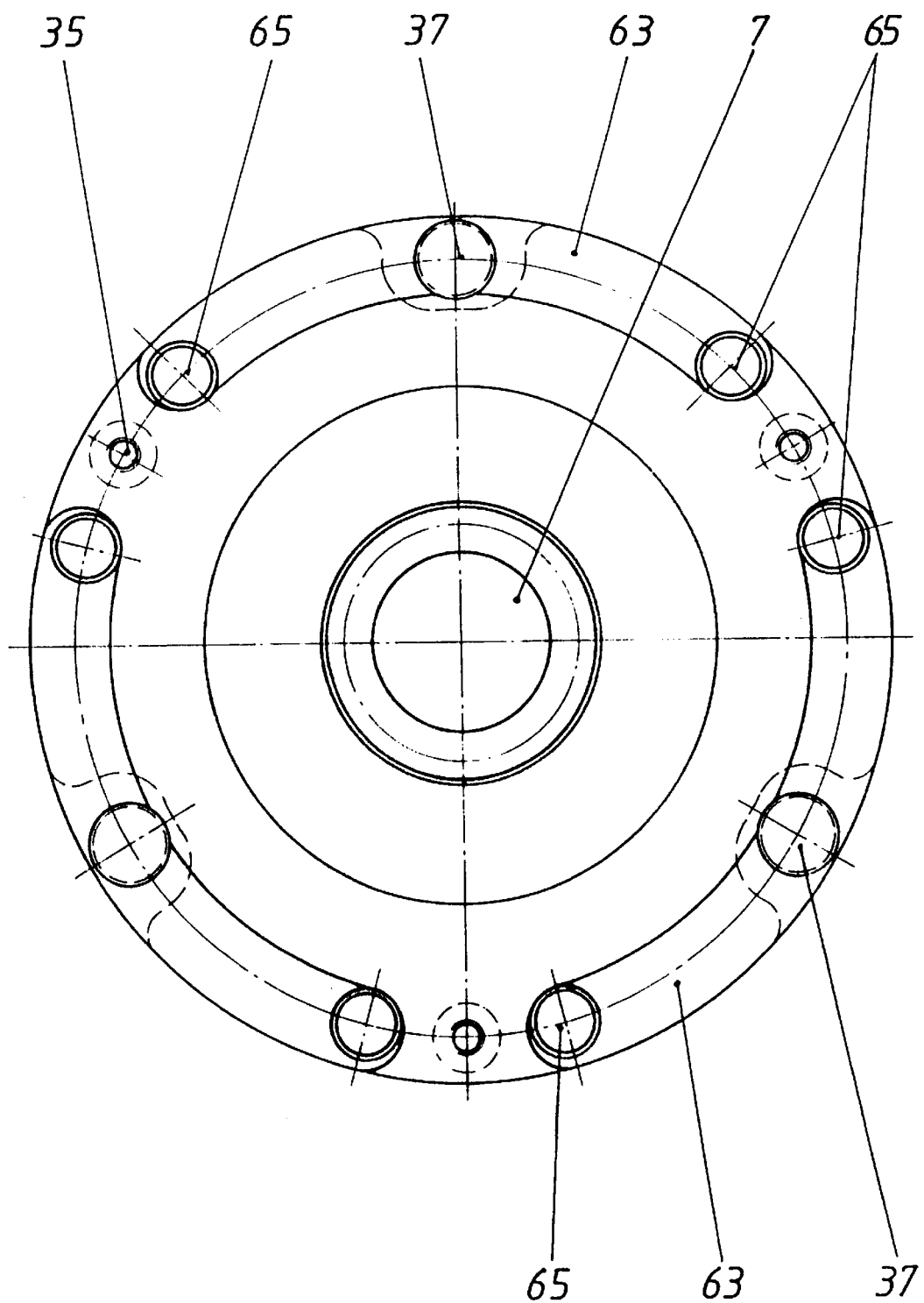
Figur 3

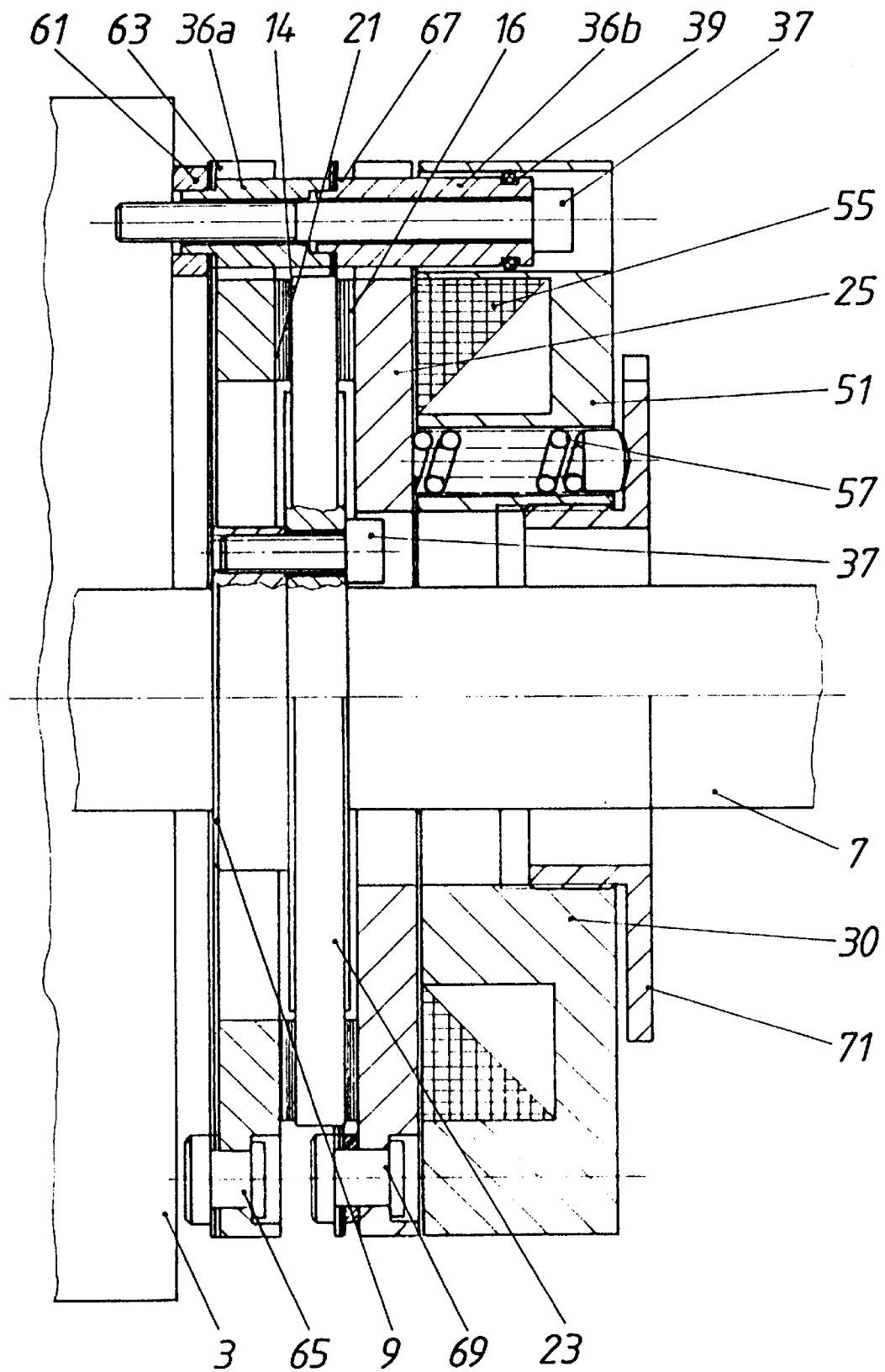
Figur 4

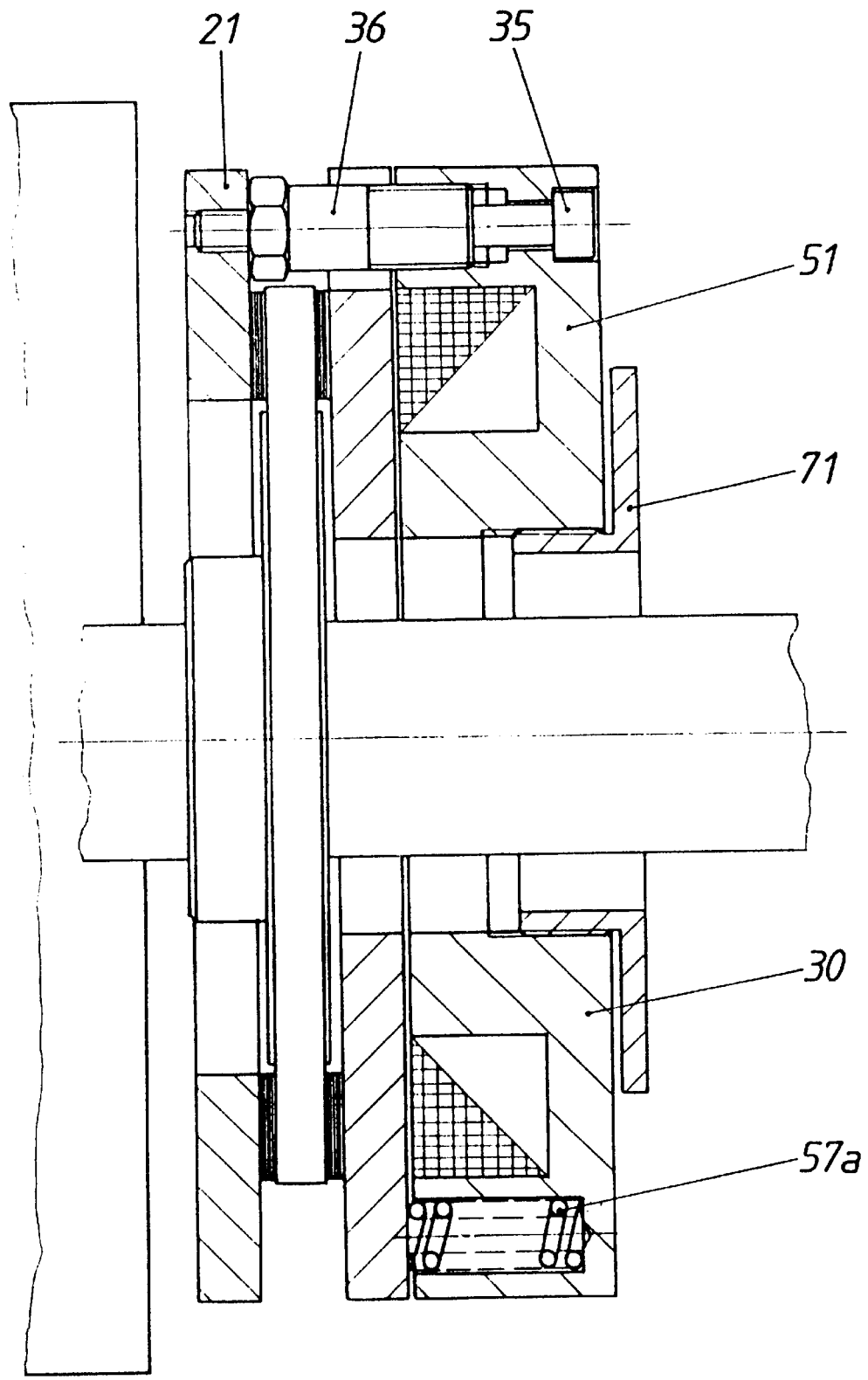
Figur 5

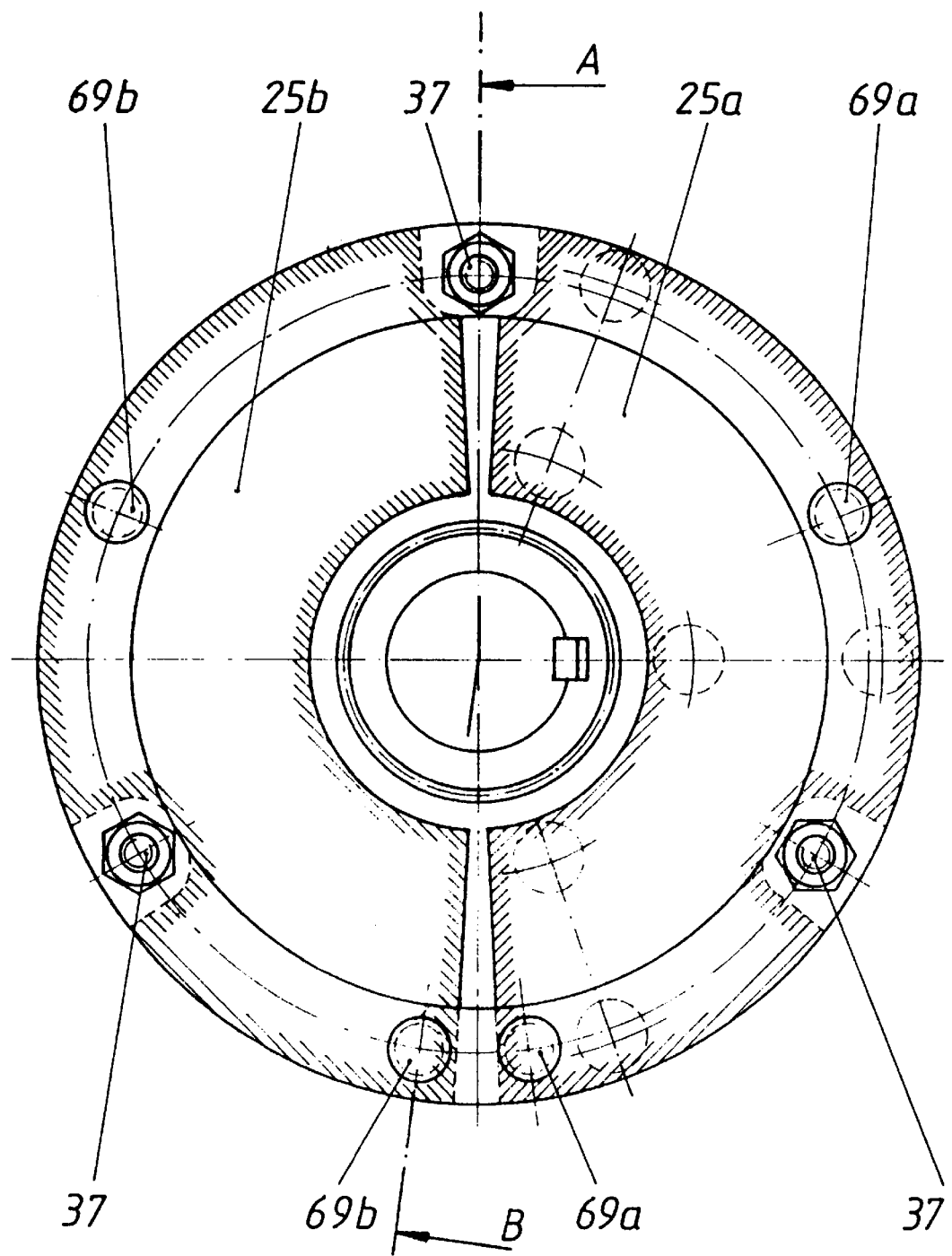
Figur 6

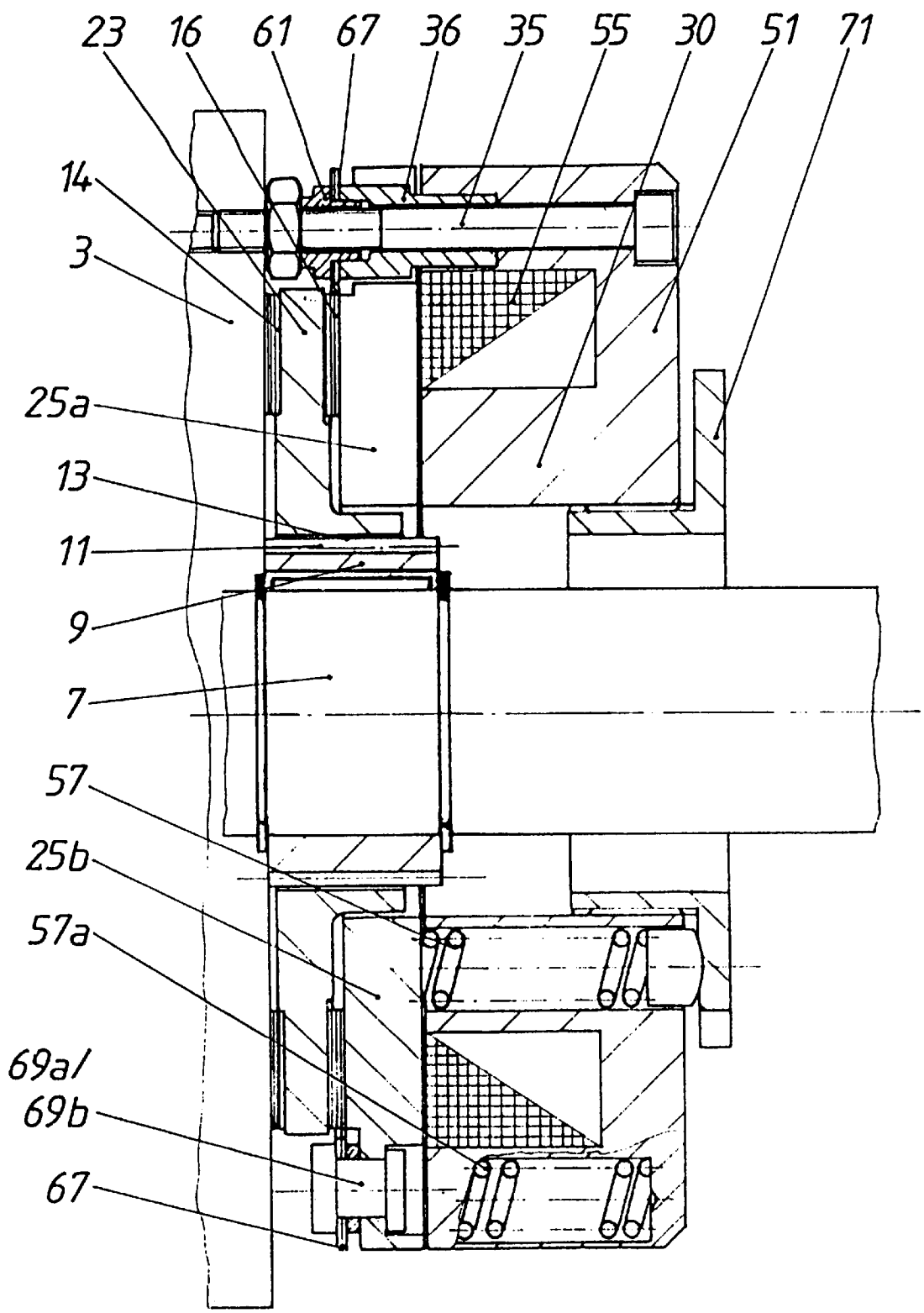
Figur 7

FRICTION SAFETY BRAKE HAVING TWO INDEPENDENT BRAKING CIRCUITS

BACKGROUND OF THE INVENTION

The invention concerns a safety brake which is releasable via an electromagnet.

A safety requirement issued by regulatory bodies demands technical equipment to be provided with two separate braking circuits so that if one braking circuit should fail, a braking operation from the other braking circuit can be provided. This is the case for elevators constructed in accordance with elevator regulation TRA 200 DIN EN 81.

In accordance with the subject matter of German Gebrauchmuster 295 10 828 two brakes are spacially integrated. In this arrangement there are two armatures, two brake disks, two spring arrangements that press the armature disks against the brake disks, and a single electromagnet with a magnetic coil arranged between the armature disks and brake disks. This arrangement provides a functionally safe, inexpensive and compact system that provides two brakes that are independent of one another.

In order to save space and to simplify the brakes while maintaining the safety function of a braking operation, and thereby reduce the cost of brakes, these brakes were further developed as shown in German Gebrauchmuster 296 11 732.3. In this brake the electromagnet comprises a magnetic coil and coil carrier that surrounds a central shaft that is arranged to be axially displaceable, but not rotatable in the brake. In addition, a single armature disk 3 that is axially displaceable, but cannot be rotated in the brake, is arranged axially between one of two brake disks 2, 11 and the magnetic coil/coil carrier. Springs are tensioned axially between the magnetic coil/coil carrier and the single armature disk 3.

A disadvantage of this twin circuit brake is that, on account of the placement of the magnetic coil in the region between the rotating brake disks, the heat that is generated on the brake disks during braking bears upon the coil from two sides. Thus, the coil is heated in accordance with the amount of frictional work done during braking. This heating can become significant, particularly in a high temperature environment, for example in warm countries. In order to prevent overheating of the coil it is necessary to limit the braking power correspondingly.

A further disadvantage of this twin circuit brake is that it is necessary to change the entire coil when the brake linings are changed. This means that an inconvenient amount of effort needs to be expended in order to change the parts subject to wear.

Obviously, this twin circuit brake also needs to comply with the aforementioned safety requirement. In particular, malfunction situations (jamming or seizure situations) that can affect the movable parts of the brake should be accounted for.

SUMMARY OF THE INVENTION

The object of the present invention is to provide a two circuit brake that satisfies the aforementioned safety requirement.

Further, it is an object of the invention to provide a two circuit brake in which the heat generated by braking effect of the brake, in particular in the vicinity of electrical components, is as small as possible.

A further object of the invention is to reduce the amount of effort expended in servicing the brake, in particular in the changing of the wearable parts of the brake, such as the brake linings.

The brake should also be constructed in the simplest possible way, so that it is easy to manufacture.

These objects are achieved in accordance with the following description of the invention.

In the two circuit brake in accordance with the invention, the heat that is generated on the brake linings during braking is only conducted to one side of the coil carrier, and then only via the armature disk. The heat can thereafter be released to the environment via the exposed outer side of the coil carrier. In this way the temperatures that occur in the coil carrier are kept relatively low.

BRIEF DESCRIPTION OF THE DRAWINGS

Exemplary embodiments for the invention will be described in the following, making reference to the figures, in which:

FIG. 1 is a longitudinal cross sectional view of the preferred exemplary embodiment shown in a non-energized condition, i.e. in the braked condition.

FIG. 2 is a longitudinal cross sectional view of an alternative exemplary embodiment of the invention, also in the braked condition.

FIG. 3 is a side view of a third embodiment of the invention.

FIG. 4 is a sectional view along the line A–B in FIG. 3 of the third embodiment of the invention.

FIG. 5 is a sectional view along the line C–D in FIG. 3 of the third embodiment of the invention.

FIG. 6 is a side view of a fourth embodiment of the invention.

FIG. 7 is a sectional view along the line A–B in FIG. 6 of the fourth embodiment of the invention.

DESCRIPTION OF THE PREFERRED EMBODIMENTS

FIG. 1 shows a two circuit brake in accordance with the preferred embodiment of the invention, wherein the two circuit brake is in a the braked condition. The two circuit brake is attached to a machine wall or back-bearing plate 3 of a motor (not shown) in order to brake a rotatable shaft 7. The shaft 7 has a collar 9 with longitudinal splines 11.

A first friction lining rotor or brake disk 14 that is disposed closer to the machine wall 3 and is rotates with the shaft 7, and a second friction lining rotor or brake disk 16 that is disposed further from the machine wall 3 and also rotates with the shaft 7, are mounted on the collar 9 by virtue of longitudinally disposed splines 13, 15 that mesh with the longitudinal splines 11. The mounting being such that the brake disks 14, 16 are displaceable longitudinally but are not rotatable with respect to the collar 9.

Between the first brake disk 14 and the machine wall 3 there is provided an annular flange plate 21. Between the first brake disk 14 and the second brake disk 16 there is provided an intermediate disk or plate 23, and on the side of the second brake disk 16 that is facing away from the machine wall 3 there is provided an armature disk or plate 25. The intermediate disk 23 serves as a friction surface for both the first brake disk 14 and the second brake disk 16. The flange plate 21 serves as friction surface for the first brake disk 14, and the armature disk 25 serves as friction surface for the second brake disk 16.

On the side of the armature disk 25 that faces away from the machine wall 3 there is provided an annular coil carrier 30, through a central opening 31 of which the shaft 7 projects coaxially.

The flange plate 21, the intermediate disk 23, the armature disk 25 and the coil carrier 30 are arranged coaxially with respect to one another and have essentially the same diameter. The shaft 7 passes through all of these components.

The coil carrier 30 is mounted a fixed distance from the flange plate 21 by an arrangement consisting of several connection screws 35 and associated spacing bushes 36. For this purpose the coil carrier 30 has several, preferably three, bores 32 around its circumference that extend in an axial direction therethrough. At the end of each bore 32 of the coil carrier 30, that is furthest from the machine wall 3, there is a countersink 34 provided for the head of the corresponding connecting screw 35. In addition, in the flange plate 21 coaxial with these bores there are provided corresponding threaded bores 33. A spacing bush 36 is provided between each threaded bore 33 of the flange plate 21 and each bore 32 of the coil carrier 30, respectively. The spacing bushes 36, with their connecting screws 35, pass through respective bores 23b in the intermediate disk 23 and concentrically placed notches 38 in the armature disk 25. Furthermore, an O-ring 39 is provided around each spacing bush 36 where it passes through the bore 23b. The O-ring 39 serves to guide the spacing bush 36 in the bore 23b of intermediate disk 23, and thereby provides radial location for the flange plate 21 and the coil carrier 30.

The coil carrier 30 is spaced a predetermined distance from the flange plate 21 by virtue of the spacing bushes 36, and is held by virtue of the connecting screws 35 which extend between the threaded bores 33 in the flange plate 21 and the countersinks 34 in the coil carrier 30.

The intermediate disk 23 disposed between the first brake disk 14 and the second brake disk 16 is fixed to and spaced from the machine wall 3 a predetermined distance by virtue of a plurality of fixing screws 37 equally distributed in a circular arrangement in the machine wall 3 and coaxial with the shaft 7. For this spacing, bushes 37a are disposed between the intermediate disk 23 and the machine wall 3. The fixing screws 37 are screwed into corresponding threaded bores 41 provided in a circular arrangement, and pass through the spacing bushes 37a. Furthermore, bores 42 are provided in the intermediate disk 23 also in a circular arrangement, with the bores 42 being coaxial with the threaded bores 41 when the intermediate disk 23 is mounted to the machine wall 3. The fixing screws 37 pass through these bores 42.

Each fixing screw 37, as seen from the side of the machine wall 3, further passes through a respective bore 44 in the armature disk 25, and the head or the end of each fixing screw 37 projects away from the machine wall 3 and penetrates respectively to a small extent into a bore 45 provided in the coil carrier 30. At the head or end of each fixing screw 37, or more exactly, between the head or end of each fixing screw 37 and a respective circular depression 46 provided on the intermediate disk 23, an intermediate sleeve 47 is disposed that penetrates at least to a substantial extent into a respective associated bore 44 in the armature disk 25.

Preferably, the connecting screws 35 and the fixing screws 37 are provided in the same circular arrangement, and alternate with each other with equal spacing.

The coil carrier 30 is partially open on the side facing the armature disk 25, and is provided with an end wall 51 on the side that is furthest from the machine wall 3. A magnetic coil 55 is immovably embedded, by virtue of a molding resin or a substance having similar properties, in an appropriately formed cut-out 53 in the coil carrier 30. The magnetic coil 55 together with the coil carrier 30 form the electromagnet of the brake.

The armature disk 25 serves as the reaction surface for the second brake disk 16 in the braking condition. In the braking condition, shown in FIG. 1, a plurality of springs 57 that are insert in the coil carrier 30, press the armature disk 25 away from the coil carrier 30 and against the second brake disc 16 in order to apply the desired braking effect. The springs 57 are disposed at equal spacing with respect to one another, and are located radially inside of the magnetic coil 55.

In the following, the function of the embodiment of the two circuit brake described with respect to FIG. 1 will be described.

FIG. 1 shows the brake in the braked condition. This occurs when electrical energy is not applied to the magnetic coil 55 in the coil carrier 30 such that the springs 57 press the armature disk 25 against the second brake disk 16. Because the connecting screws 35 maintain the coil carrier 30 at a predetermined distance from the flange plate 21, which lies between the machine wall 3 and the first brake disk 14, the pressing of the armature disk 25 against the brake disk 16 causes the latter to press on the intermediate disk 23. The distance of the intermediate disk 23 to the machine wall 3 is fixed by the spacing bushes 37a so that the intermediate disk 23 cannot move towards and be forced against the first brake disk 14.

The distance between the coil carrier 30 and the flange plate 21 is fixed by the spacing bushes 36. Thus, in operation of the brake the springs 57 urge the armature disk 25 and the coil carrier 30 apart, and in particular press the coil carrier 30 away from the armature disk 25, such that the flange plate 21 is urged against the first brake disk 14, which in turn is urged against the intermediate disk 23.

In this way during operation of the brake, both the first brake disk 14 and the second brake disk 16 are braked from both sides.

In the released condition of the two circuit brake in accordance with the invention, the magnetic coil is energized so that the armature disk 25 is pulled towards the coil carrier 30 against the force of the springs 57. Because the distance between the coil carrier 30 and the flange plate 21 is fixed by the fixing screws 35 and the spacing bushes 36, the distance between the flange plate 21 and the armature disk 25 increases. The relative position of the intermediate disk 23 to the machine wall 3 is fixed by the spacing bushes 37a and the fixing screws 37. Both brake disks 14 and 16 are axially displaceable on the shaft 7 by virtue of their longitudinal splines 13 and 15 and the longitudinal splines 11 of the shaft collar 9. In the released condition of the brake, the first brake disk 14 and the flange plate 21 on one side, and the second bake disk 16 and the armature disk 25 on the other side, are therefore, moveable to a small extent relative to the intermediate disk 23.

In the transition from the braked condition to the released condition, the assembly consisting of the flange plate 21 and the coil carrier 30, held apart by the connecting screws 35 and the spacing bushes 36, moves slightly towards the machine wall 3. At the same time the spacing bushes 36 with their O-rings slide and are guided within the bores 23b of the intermediate disk 23.

The two circuit brake in accordance with the invention as shown in FIG. 1 compensates for both malfunction conditions (jamming conditions) set out below, that can occur in the transition from the released to the braked condition. In both malfunction conditions braking is achieved.

Firstly, a jamming of the armature disk 25 with respect to the guide sleeve 47 is overcome. In this case the armature disk 25 does not move further towards the second brake disk 16, however, the springs 57 effect a pressing apart of the armature disk 25 and the coil carrier 30 to the same extent as in the normal condition. Because the connecting screws 35 and the spacing bushes 36 hold the coil carrier 30 and the flange plate 21 at a predetermined distance from one another, the flange plate 21, on account of the urging away of the coil carrier 30 from the armature disk 25, moves in a direction away from the machine wall 3 towards the first brake disk 14. In this way the flange plate 21 presses against the first brake disk 14, which thereby presses against the intermediate disk 23 on account of the slideability of the first brake disk 14 on the collar 9. In this way a braking by at least one of the braking circuits is achieved during this jamming condition.

Secondly, during transition from the released to the braked condition, a jamming of at least one of the spacing bushes 36 in the corresponding bore 23b in the intermediate disk 23 is overcome by the arrangement in accordance with the invention. If a seizure jam) occurs at this location at least the armature disk 25 is pressed against the second brake disk 16 by virtue of the springs 57, so that one of the braking circuits of the two circuit brake functions.

In the two circuit brake in accordance with the invention and shown in FIG. 1 there are the following force flux lines.

In the normal situation, a force flux line extends from the spring 57 through the armature disk 25 and the second brake lining 16 to the intermediate disk 23. This force flux line is closed by a force flux line that begins at the end of the spring 57 remote from the armature disk 25 and proceeds through the coil carrier 30 to the connecting screws 35 and the spacing bushes 36. From there it reaches the intermediate disk 23 via the first brake disk 14 to close the force flux path.

In the first jammed condition, that is upon seizure of the armature disk 25 with the guide sleeve 47, a force flux line that begins at the end of the spring 57 remote from the armature disk 25 runs through the coil carrier 30 to the connecting screws 35 and the spacing bushes 36 to the flange plate 21. From there it reaches the intermediate disk 23 via the first brake disk 14. This force flux line is closed by a force flux line that reaches the intermediate disk 23 from the springs 57 through the armature disk 25, and from there, on account of the seizure, through the guide sleeves 47 to the intermediate disk 23.

In the second jammed condition, that is upon seizure of at least one of the spacing bushes 36 in its corresponding bore 23b of the intermediate disk 23, the closed force flux line runs from one of the springs 57, to the armature disk 25, and from there through the second brake disk 16 to the intermediate disk 23 to the other end of the spring 57, i.e. the end facing away from the armature disk 25 through the coil carrier 30 to the connecting screws 35, and from there, on account of the seizure of the spacing bushes 36 likewise to the intermediate disk 23.

The following modifications of the two circuit brake embodying the invention and described with respect to FIG. 1 are envisaged.

An adjustment of device, for example a set screw 71 could be used for adjustment of the springs 57.

The number of springs 57, connecting screws 35 and bushes 36, as well as the number of fixing screws 37 with bushes 37a, and guide bushes 47 can be different from that described above.

Now follows a description of a two circuit brake embodying the present invention and shown in FIG. 2. In this embodiment, components which have the same function are identified by the same reference numerals as in the above described embodiment.

In this embodiment, in the released state of the brake an outer ring or a drum 3 rotates about a shaft 7. The shaft has a collar 9 on which there is mounted a bearing 4 to support the drum 3. In the braked condition, shown in FIG. 2, the drum 3 is stationary with respect to the shaft 7.

The intermediate disk 23 is secured onto the collar 9 by virtue of several collar screws or fixing screws 37 that are screwed into the radial side of the collar 9 that faces away from the drum 3, and are distributed evenly around the circumference of the intermediate disk 23. Thereby, the intermediate disk 23 is axially located not only relative to the drum 3, but also relative to the shaft 7. The intermediate disk 23 has evenly distributed in a circular arrangement several bores 23b through which the connecting screws 35 with spacing bushes 36 penetrate. On the outer surface of the spacing bushes 36 in the vicinity of the bore 23b there is an O-ring 39 for the purpose of guiding the spacing bush 36 within the bore 23b.

The connecting screws 35 connect a cylindrically shaped flange plate 21, that is disposed between the drum 3 and the intermediate disk 23, to the coil carrier 30. The flange plate 21 has for this purpose several threaded bores 33 to receive the connecting screws 35. In the direction facing away from the drum 3 are, in addition to the intermediate disk 23, an armature disk 25 and the coil carrier 30. The coil carrier 30 has bores 32 with countersinks 34 disposed at their ends away from the drum 3 for receiving corresponding heads of the connecting screws 35. The armature disk 25 has recesses 38. Bores 32, 33, 23b and recess 38 correspond with each other in their number and also their radial and circumferential position, so that the connecting screws 35 and their spacing bushes 36 penetrate through the intermediate disk 23 and the armature disk 25, and at the same time hold the flange plate 21 a predetermined distance from the armature disk 30. Thus, the arrangement consisting of the flange plate 21, the coil carrier 30, the connecting screws 35 and the spacing bushes 36 is slidably disposed relative to the shaft 7 and to the intermediate disk 23.

The intermediate disk 23 further has bores 44 that are also evenly distributed in a circular arrangement having a radius larger than that of the circular arrangement of the bores 23b for the spacing bushes 36. Guide pins or bolts 47, at least partly, pass through these bores 44 and are pressed into corresponding bores in the armature disk 25. The guide pins 47 serve as guides for the armature disk 25 with respect to the intermediate disk 23.

The flange plate 21, the intermediate disk 23, the armature disk 25 and the coil carrier 30 are coaxially disposed with respect to one another and have essentially the same outer diameter. The shaft 7 passes through the flange plate 21, the intermediate disk 23, the armature disk 25 and the coil carrier 30.

Along the outer circumference of the drum 3 are several fastening screws 10 that are evenly distributed about the circumference of the drum 3 and penetrate through a respective bush 11 disposed between the head of the fixing screw 10 and the drum 3. The bushes 11 hold a first friction lining carrier 14a and a second friction lining carrier 16a in a slidable manner. The friction lining carriers 14a, 16a are ring shaped and have corresponding bores along their circumferences, so that they fit on the bushes 11. A respective brake lining 14b, 14c; 16b, 16c is glued on both sides of each friction lining carrier 14a, 16a at respective inner peripheries thereof. The intermediate disk 23 has an outer edge portion or a tongue 23c that has a smaller thickness than the rest of the intermediate disk 23. The tongue is, however, of constant thickness over its radius. The respective brake lining 14b, 14c; 16b, 16c of the friction lining carrier 14a, 16a is, when viewed radially disposed in the region of the tongue 23c, and extends not quite as far as the inner radius of the tongue 23c. In addition the first friction lining carrier 14a is disposed on the side of the tongue 23c nearest the drum 3 between the flange plate 21 and the tongue 23c, while the second friction lining carrier 16a is disposed on the side of the tongue 23c that is furthest from the drum 3 between the armature disk 25 and the tongue 23c. With this arrangement a braking effect can be achieved when the brake lining 14b facing the flange plate 21 is pressed against the flange plate 21, the brake linings 14c and 16b facing the tongue 23c is pressed against the tongue 23c, and the brake lining 16c facing the armature disk 25 is pressed against the armature disk 25.

The coil carrier 30 is, as in the exemplary embodiment described with respect to FIG. 1, on the side facing the armature disk 25 partially open and is provided with an end wall on the side facing away from the drum 3. In the coil carrier 30 is a correspondingly shaped cut-out 53 in which a magnetic coil 55 is embedded by virtue of a casting resin or equally effective material. The magnetic coil 55 together with the coil carrier 30 forms the electromagnet of the brake.

Furthermore, a plurality of springs 57 are provided in corresponding bores in the coil carrier 30, with the bores being evenly spaced around the circumference of the coil carrier 30 and open on the side facing the armature disk 25. If the magnetic coil 55 is not energized the springs 57 press the armature disk 25 away from the coil carrier 30.

The axial position of the intermediate disk 23 is fixed in the embodiment shown in FIG. 2, as it is in the embodiment described with respect to FIG. 1. The assembly consisting of the flange plate 21, the coil carrier 30, the spacing bush 36 and the connecting screws 35 are displaceably disposed with respect to the intermediate disk 23. Also, the armature disk 25 is moveable with respect to the coil carrier 30 in response to the force exerted by the springs 57 and the magnetic coil 55. The brake linings 14b, 14c and 16b, 16c are positioned axially to abut the flange plate 21 and the armature disk 25.

Now follows a description of the two circuit brake embodying the present invention and described with respect to FIG. 2.

The non-energized or braked condition of this embodiment is shown in FIG. 2. With a non-energized magnetic coil 55 the springs 57 press the armature disk 25 against the second friction lining carrier 16a that, on account of its displaceability on the bush 11, presses against the intermediate disk 23. The springs 57 exert a force on the coil carrier 30 in a direction away from the intermediate disk 23. This force is conducted via the connecting screws 35 and the spacing bushes 36 to the flange plate 21, and thereby via the first friction lining carrier 14a to the intermediate disk 23. In this condition all of the brake linings 14b, 14c and 16b, 16c exert a braking effect.

In the released condition of the brake current flows into the magnetic coil 55 and the armature disk 25 is pulled against the spring 57 and then against carrier 30. Thus, the distance between the flange 21 and the armature disk 25 increases while, on account of the slideability of the spacing bushes 36 in the intermediate disk 23, the friction lining carriers 14a and 16a with their associated brake linings 14b, 14c, 16b, 16c release from their braking engagement with the intermediate disk 23.

The two circuit brake in accordance with the invention and described with respect to FIG. 2 covers the following two malfunction (jamming) conditions.

First, if the spacing bushes 36 seizes in the bore 23b there is at least a braking effect caused by the armature disk 25, the second friction lining carrier 16a and the intermediate disk 23.

Second, in the event of the seizure of the guide pin 47 in the intermediate disk 23 a braking effect is provided by virtue of the flange plate 21, the first friction lining carrier 14a and the intermediate disk 23 as the spring 57, in reaction to this seizing condition exerts a pressure on the coil carrier 30 in a direction away from the drum 3, whereby a force is conducted via the spacing bushes 36 onto the flange plate 21. In the embodiment of FIG. 2 there are the following closed force flux lines.

In the normal situation there is a force flux line emanating from the spring 57 that transfer its force via the second friction lining carrier 16a to the intermediate disk 23. Also emanating from the spring 57 there is a flux line via the coil carrier 30, to the spacing bushes 36 and to the flange plate 21, and from there via the first friction lining carrier 14a, onto the opposite side of the intermediate disk 23.

Further in the first mentioned jammed condition, a force flux line from the spring 57 passes onto the armature disk 25, and from there to the second friction lining carrier 16a and then onto the intermediate disk 23. At the same time a force flux passes from the spring 57 onto the coil carrier 30, and via the spacing bushes, on account of the seizure, onto the intermediate disk 23.

In the second mentioned jammed condition, (seizure of the guide pins 47) a force flux line runs from the spring 57 onto the armature disk 25 and the guide pin 47, and from there, on account of the seizure, onto the intermediate disk 23. At the same time a force flux line runs from the spring 57 onto the coil carrier 30 and from there, via the spacing bushes 36 and the first friction lining carrier 14a, onto the intermediate disk 23.

The following alternative arrangements of the two circuit brake of the embodiment of the invention described in respect to FIG. 2 are envisaged.

For the adjustment of the springs 57 there can be provided an adjustment device, for example an adjustment screw 71.

The number of fixing screws 37, of springs 57, of connecting screws 35 with spacing bushes 36, and the number of fixing screws 10 with bushes 11 can also differ from that described above.

Instead of fixing screws 37 there can be provided other connections between the shaft 7 and the intermediate disk 23.

The embodiment described with respect to FIG. 2 can also be constructed with a fixed drum 3 and a rotating shaft 7.

In the following, the third embodiment of the invention will be described with reference to FIGS. 3, 4 and 5. Components that have the same function as corresponding components in the first or second embodiments will be given the same reference numbers.

The third embodiment shown in FIGS. 3, 4, 5 has, in common with the embodiment of FIG. 1, a rotating shaft 7 of a motor (not shown) with a collar 9, on which an intermediate disk 23 is fixed by virtue of several fixing screws 37 uniformly positioned around the circumference of the intermediate disk 23. Between the machine wall or an end bearing 3 of the motor and the intermediate disk 23 is a flange plate 21. On the side of the intermediate disk 23 that is furthest from the machine wall 3 there is provided an armature disk 25 and a coil carrier 30 with a magnetic coil 55 and several springs 57 distributed uniformly around the circumference of the coil carrier 30.

In a manner analogous to the arrangement shown in FIG. 2, the axial spacing between the flange plate 21 and the armature disk 25 adjusts itself on several spacing bushes 36a which extend in the axial direction and are distributed around the circumference of the brake. On the end of each spacing bush 36a that is furthest from the machine wall 3 there is provided a bush 36b. The end of each bush 36b that is furthest from the machine wall 3 projects into a respective bore of the coil carrier 30. To provide further guiding of the bush 36b an O-ring 39 is fixed to the outer surface of the bush 36b. This O-ring 39 fills the space between the bush 36b and the corresponding bore of the coil carrier 30 at an appropriate place.

Each spacing bush 36a together with the bush 36b is fixed by virtue of a fixing screw 37 to the machine wall 3. It is also envisaged that there is provided a spacing sleeve 61 between the spacing 36a and the machine wall 3. Between the spacing sleeve 61 and the spacing bush 36a is an arc shaped first spring lamella or leaf spring 63 that is centrally secured therebetween. Around the entire circumference of the brake there are preferably provided three uniformly distributed first spring lamella or leaf springs 63, each extending the same arc. On a free end of each first spring lamella or leaf spring 63 the flange plate 21 is fixed by virtue of rivets 65. The flange plate 21 is thereby suspended on the first spring lamella or leaf spring 63 in a resilient manner and is axially displaceable with respect to the machine wall 3 and the intermediate disk 23. Along a circumferential edge portion of the flange plate 21, a first brake lining 14 is glued on the side of the flange plate 21 facing the intermediate disk 23.

Between each spacing bush 36a and each bush 36b a second spring lamella or leaf spring 67 is fixed at its middle. On free ends of each second spring lamella or leaf spring 67 there is suspended the armature disk 25 by virtue of rivets 69 in a manner such that the armature disk 25 is resiliently and axially moveable with respect to the intermediate disk 23. Along a circumferential edge of the armature disk 25 on the side facing the intermediate disk 23 there is glued a second brake lining 16.

Between each two rivets 65 (or 69) are disposed the spacing bushes 36a which extend between the flange plate 21 and the coil carrier 30. Provided for each spacing bush 36a is a corresponding bore in the flange plate 21, a respective bore in the coil carrier 30 and a corresponding screw.

The assembly consisting of the flange plate 21, the spacing 36a and the coil carrier 30, and in the same manner the armature disk 25, are independently axially displaceable with respect to the intermediate disk 23.

An adjustment screw 71 is screwed in the rear side of the coil carrier 30, which adjustment screw 71 positions the end of each spring 57 that is remote from the armature disk 25, so as to adjust the spring force acting on the armature disk 25. As shown in FIG. 5, in addition to the springs 57, that are radially inward of the magnetic coil 55 and extend in an axial direction, there are also springs 57a that also extend in an axial direction in the coil carrier 30.

In the following there will be described the function of the third embodiment according to FIGS. 3, 4 and 5.

In the braked condition shown in FIGS. 3, 4 and 5, the magnetic coil 55 is not energized and therefore the springs 57, 57a press the armature disk against the intermediate disk 23. As soon as this happens the coil carrier is moved by the springs 57, 57a in a direction away from the intermediate disk 23. This causes the flange plate 21, on account of the spacing bushes 36a, to move into braking engagement with the intermediate disk 23. In the normal situation both the armature disk 25 and the flange plate 21 are in braking contact with the intermediate disk 23 by virtue of their associated brake linings 14, 16.

In the released state of the brake, the magnetic coil 55 is energized and attracts the armature disk 25. The space between the armature disk 25 and the flange plate 21 thereby increases. In this situation neither the flange plate 21 nor the armature disk with its brake lining 14, 16 are in braking engagements with the intermediate disk 23.

The embodiment according to FIGS. 3, 4 and 5 overcomes all of the jammed conditions that can be imagined affecting the moveable parts, and that correspond to the jammed situations described with respect to the earlier described embodiments.

In this third embodiment, in a place of the leaf springs or spring lamella 63, 67 other spring elements can be used.

Also the number of springs 57, the number of rivets 65, 69 the number of fixing screws 37 with their spacing sleeves 61, and the number of bushes 36b, 36a can also differ from that described.

In the following, a fourth embodiment will be described with reference to FIGS. 6 and 7. Components that have the same function as corresponding components in the first, second or third embodiments bear the same reference numerals.

In a manner analogous to the embodiment described with respect to FIGS. 3 to 5, the fourth embodiment has a machine wall 3, a shaft 7 with a splined collar 9 that rotates but is fixed in an axial direction, a coil carrier 30 with armature disk halves 25a, 25b, and a rotatable intermediate disk 23 between the machine wall 3 and the armature disk halves 25a, 25b. A first brake lining 14 is glued at a circumferential edge portion of the intermediate disk 23 on the surface of the intermediate disk 23 facing the machine wall 3. In addition, on the side of the intermediate disk 23 facing away from the machine wall 3 there is a coil carrier 30, and between this coil carrier 30 and the intermediate disk 23 there are the first armature disk half 25a and the second armature disk half 25b. The armature disk halves 25a, 25b form essentially two separate semi-circular or arcuate segments extending for about 180°. On the circumferential edge portion of each armature disk half 25a, 25b on the surface facing the intermediate disk 23 there is glued a second brake lining 16. The coil carrier 30 houses a magnetic coil 55 and several springs 57 extending in an axial direction and located radially inside of the magnetic coil 55, and several springs 57a extending in an axial direction and located radially outside of the magnetic coil 55. For each spring a respective axially extending bore is in the coil carrier 30. The springs 57 that are radially inward with respect to the magnetic coil 55 are adjusted by virtue of an adjustment screw 71 that is screwed into the side of the coil carrier 30 that faces away from the machine wall 3.

The intermediate disk 23 has on its radially inward side longitudinal splines 13 that mesh with longitudinal splines 11 on the radially outer surface of the splined collar 9.

The coil carrier 30 is fixed in the axial direction to the machine wall 3 by virtue of several fixing screws 35 each having a corresponding spacing sleeve 61 and a spacing bush 36. The spacing sleeve 61 is disposed between the machine wall 3 and the coil carrier 30. Between the spacing sleeve 61 and the spacing bush 36 are a total of two arc shaped spring lamella or leaf springs 67a, 67b that each extend half of the circumference of the brake. Each spring lamella or leaf spring 67a, 67b has the same length. The design of each spring lamella or leaf spring 67a and 67b is such that its outer radius is equal to the outer radius of the coil carrier 30. In its relaxed condition, the longitudinal disposition of the spring lamella or leaf springs 67a and 67b is in the circumferential direction of the coil carrier 30. At two spaced apart locations on the longitudinal extent of each spring lamella or leaf spring 67a, 67b there is fixed by virtue of two rivets 69a the half of the armature disk half 25a, and by virtue of two rivets 69b the armature disk half 25b, so that these armature disk halves 25a, 25b are suspended so as to be axially displaceable and resiliently mounted with respect to the coil carrier 30. In the preferred embodiment the rivets 69a and 69b are arranged, when viewed in the circumferential direction, alternating and with the same spacing as the fixing screws 37.

In the braked condition, as shown in FIGS. 6 and 7 the magnetic coil 55 is not energized, the springs 57a, 57b, press both armature disk halves 25a and 25b and the second brake linings 16 against the intermediate disk 23. The brake lining attached to the intermediate disk 23 is pressed against the machine wall 3, which performs the function of the flange plate of the other embodiments.

In the released condition, the magnetic coil 55 is energized and both armature disk halves 25a and 25b attracted to the inner side of the coil carrier 30. In this way the armature disk halves 25a and 25b no longer press against the intermediate disk 23, and thus the intermediate disk no longer presses against the machine wall 3 so that the brake is released.

Also, in this embodiment all simple jammed conditions that can affect the moving parts and that can occur in the transition to the braked condition are accounted for.

Upon seizure of one armature disk half, for example the armature disk half 25a, the other armature disk half 25b is moveable.

In accordance with the embodiment of FIGS. 6 and 7 there are in particular the following alternatives that are possible.

In place of the splines between the collar 9 and the intermediate disk 23, there could be a lamella or plate which is able to transmit torque and yet remain axially moveable.

In place of the lamella springs or leaf springs 67a, 67b other spring elements can be used.

The number of springs 57a, 57b, the number of rivets 69a, 69b and the number of fixing screws 35 with spacing bushes 36 can be different from that described.

The features of each component of one described embodiment can alternatively be replaced by the features of this component from another embodiment, as long as the corresponding described braking function is not changed.

What is claimed is:

1. A friction safety brake comprising:
    a brake member;
    a first surface;
    a second surface;
    a biasing arrangement to exert a first force against said brake member such that said brake member becomes biased against said first surface and said second surface;
    an electromagnet to exert a second force such that the first force becomes removed from said brake member, whereby said brake member is not biased against said first surface and said second surface; and
    structure associated with said brake member such that should the first force exerted by said biasing arrangement against said brake member become incapable of causing said brake member to be biased against said first surface, the first force causes said brake member to be biased against said second surface,
    wherein said structure comprises a first armature plate portion having a first spring element connected to an outer peripheral region thereof, a second armature plate portion having a second spring element connected to an outer peripheral region thereof, an intermediate plate, and a carrier housing said biasing arrangement and a magnetic coil, wherein said electromagnet includes said magnetic coil and said carrier, with said first armature plate portion and said second armature plate portion being positioned between said intermediate plate and said carrier, such that said first armature plate portion is axially movable relative to said second armature plate portion, and
    wherein said brake member is positioned between said intermediate plate and said first and second armature plate portions, whereby said first surface is provided by one of said first armature plate portion and said intermediate plate, and said second surface is provided by one of said second armature plate portion and said intermediate plate.

2. The friction safety brake according to claim 1, wherein said first spring element comprises a first leaf spring, and said second spring element comprises a second leaf spring.

3. The friction safety brake according to claim 2, wherein said structure further comprises a first threaded member passing through said carrier and said first leaf spring, and a second threaded member passing through said carrier and said second leaf spring, such that said first armature plate portion is supported by said first threaded member and axially movable therealong, and said second armature plate portion is supported by said second threaded member and axially movable therealong.

4. The friction safety brake according to claim 1, wherein said intermediate plate comprises an annular member having axially extending splines along an inner circumferential surface thereof to allow for axial displacement of said intermediate plate relative to said first and second armature disk portions.

5. The friction safety brake according to claim 1, wherein said brake member is attached to one side of said intermediate plate, with said first armature plate portion providing said first surface and said second armature plate portion providing said second surface.

6. The friction safety brake according to claim 5, and further comprising another brake member attached to a second side of said intermediate plate, wherein said second side faces in a direction opposite to the direction in which said first side faces.

7. The friction safety brake according to claim 1, wherein said first armature plate portion and said second armature plate portion each comprises an arcuate segment of about 180°.

* * * * *